United States Patent [19]

Delmolino et al.

[11] Patent Number: 5,554,452
[45] Date of Patent: Sep. 10, 1996

[54] METAL-AIR BATTERIES HAVING IMPROVED AIR ACCESS VALVES

[75] Inventors: William P. Delmolino, Cumming; Ronald A. Putt, Marrieta, both of Ga.

[73] Assignee: Matsi, Inc., Atlanta, Ga.

[21] Appl. No.: 310,438

[22] Filed: Sep. 22, 1994

[51] Int. Cl.⁶ ............................................. H01M 2/00
[52] U.S. Cl. ........................ 429/10; 429/27; 429/38; 429/82; 429/96; 429/99; 429/218; 429/229
[58] Field of Search ................................. 429/10, 27, 38, 429/82, 96, 99, 218, 229

[56] References Cited

U.S. PATENT DOCUMENTS

| | | | |
|---|---|---|---|
| 1,899,615 | 2/1933 | Heise | 429/27 |
| 2,120,618 | 6/1938 | Martus et al. | 136/136 |
| 2,468,430 | 4/1949 | Derksen | 136/173 |
| 2,702,310 | 2/1955 | Kaye et al. | 136/111 |
| 2,797,254 | 6/1957 | Schumacher et al. | 136/177 |
| 3,818,439 | 6/1974 | Maine | 340/81 R |
| 3,897,268 | 7/1975 | Haraguchi | 136/173 |
| 4,115,626 | 9/1978 | Sauer et al. | 429/27 |
| 4,142,179 | 2/1979 | Lowndes | 340/321 |
| 4,177,327 | 12/1979 | Mathews et al. | 429/27 |
| 4,230,777 | 10/1980 | Gatto | 429/97 |
| 4,262,062 | 4/1981 | Zatsky | 429/27 |
| 4,371,593 | 2/1983 | Ramey | 429/97 |
| 4,380,576 | 4/1983 | Yoshida et al. | 429/27 |
| 4,439,500 | 3/1984 | Gibbard et al. | 429/27 |
| 4,493,880 | 1/1985 | Lund | 429/97 |
| 4,620,111 | 10/1986 | McArthur et al. | 307/150 |
| 4,857,885 | 8/1989 | Umerez | 340/321 |
| 4,871,627 | 10/1989 | Strong et al. | 429/27 |
| 4,959,280 | 9/1990 | Amthor | 429/27 |
| 5,011,747 | 4/1991 | Strong et al. | 429/27 |
| 5,069,986 | 12/1991 | Dworkin et al. | 429/27 |
| 5,093,212 | 3/1992 | Lloyd et al. | 429/27 |
| 5,191,274 | 3/1993 | Lloyd et al. | 320/2 |
| 5,240,785 | 8/1993 | Okamura et al. | 429/27 |
| 5,304,431 | 4/1994 | Schumm, Jr. | 429/27 |
| 5,328,778 | 7/1994 | Woodruff et al. | 429/27 |
| 5,387,477 | 2/1995 | Cheiky | 429/27 |

FOREIGN PATENT DOCUMENTS 71.43289  12/1971  France .

*Primary Examiner*—Bruce F. Bell
*Attorney, Agent, or Firm*—Leydig, Voit & Mayer, Ltd.

[57] ABSTRACT

A prismatic metal-air battery is provided for having at least one prismatic metal-air cell received in a cell cavity of a prismatic casing. The casing comprises a wall portion which defines a surface. The wall portion has at least one opening in communication with the cell cavity which is adapted to allow the passage of air into the cell cavity. The casing also includes a valve member having a surface bearing on the wall portion surface. The valve member also has at least one opening therein. The wall portion surface and the valve member surface are adapted to allow movement of the valve member across the wall portion surface between a closed position, in which the valve member opening does not overlap with the wall portion opening, and an open position, in which the valve member opening and wall portion opening at least partially overlap. Importantly, the casing also includes means for providing an attractive force between the wall portion and the valve member.

25 Claims, 2 Drawing Sheets

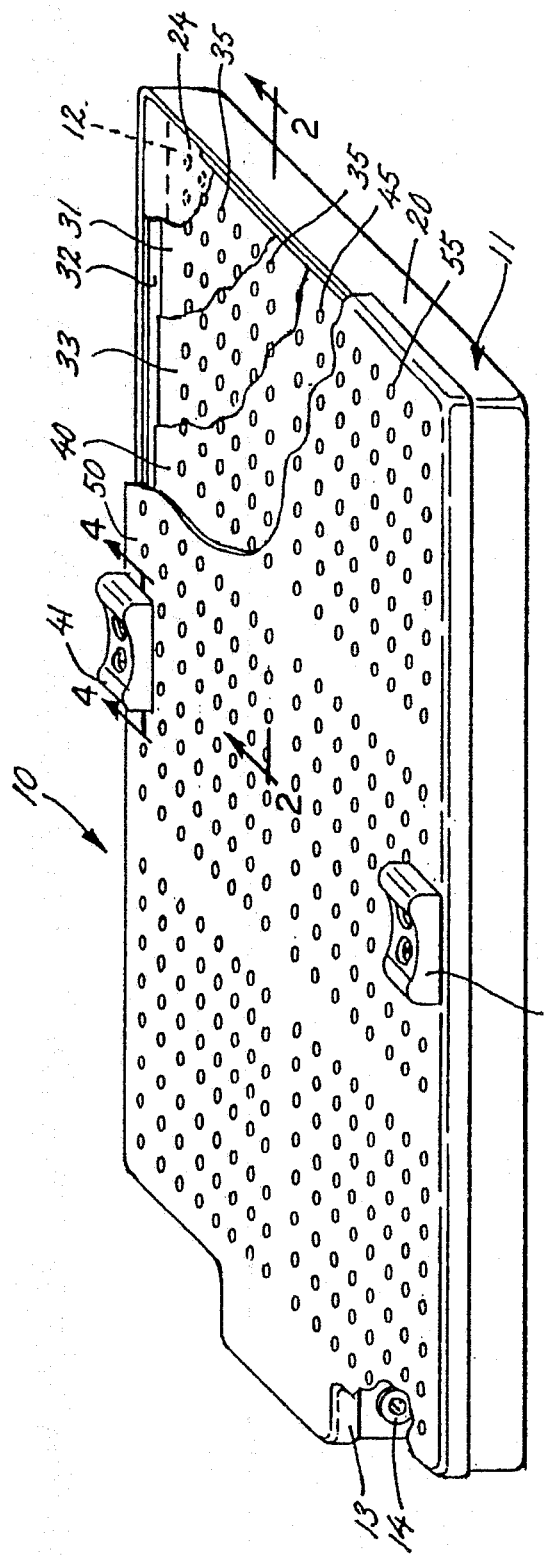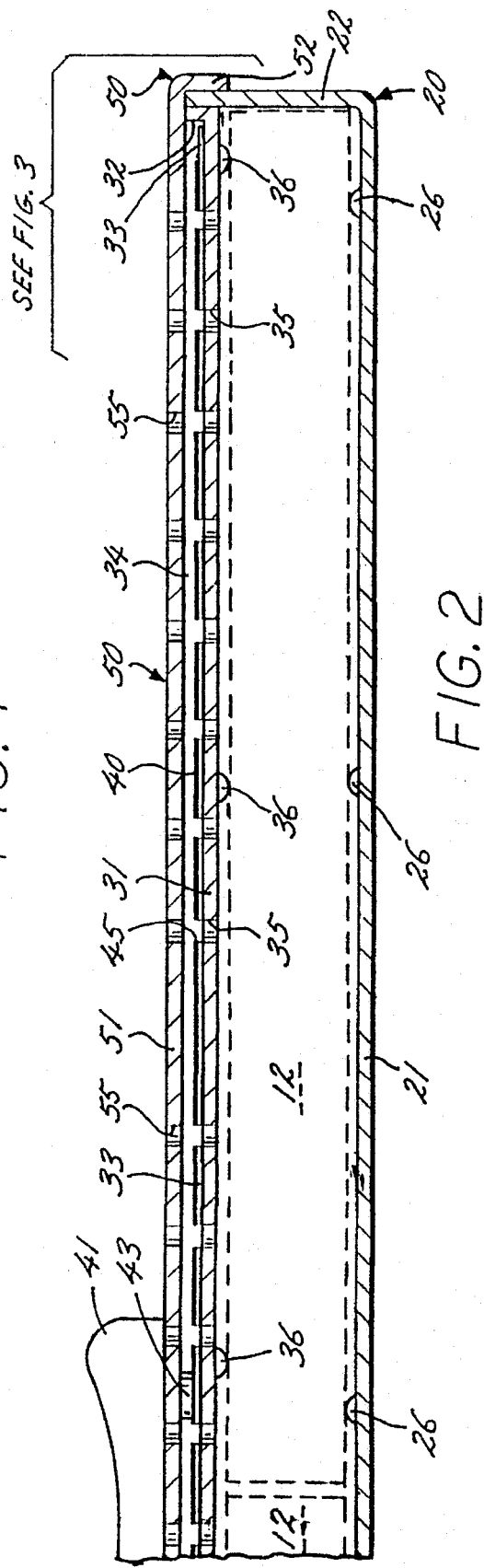

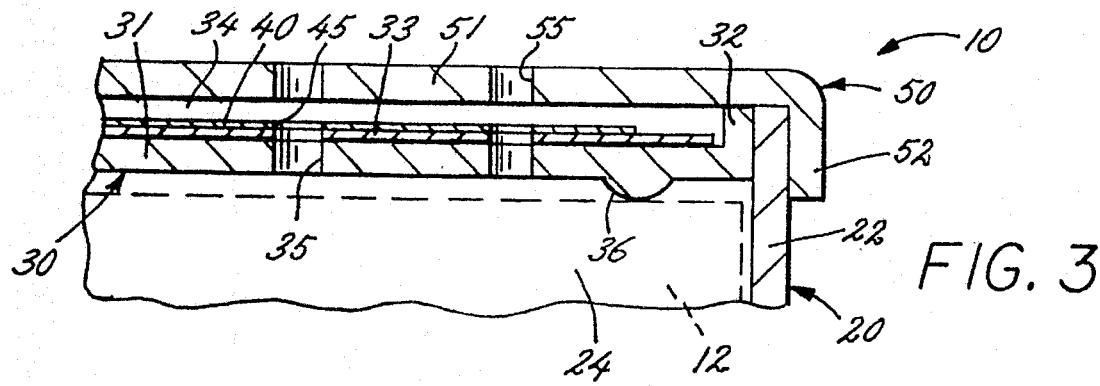
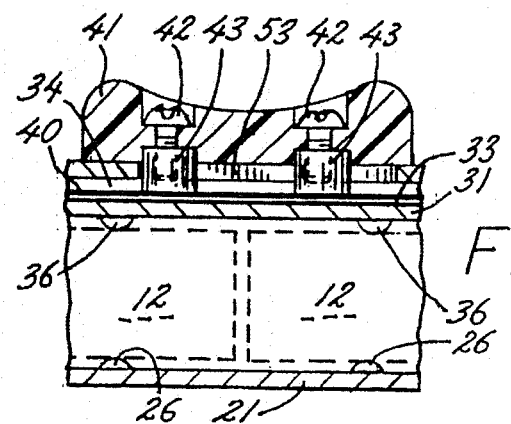
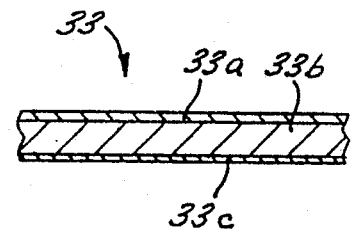
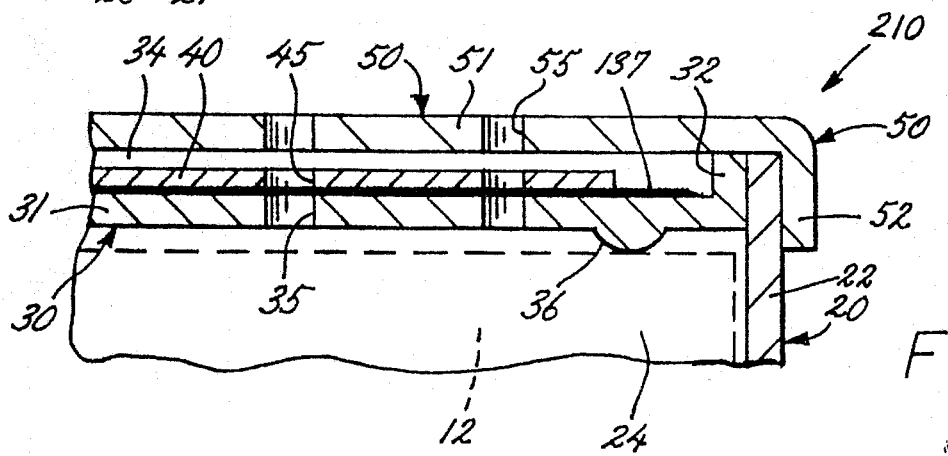
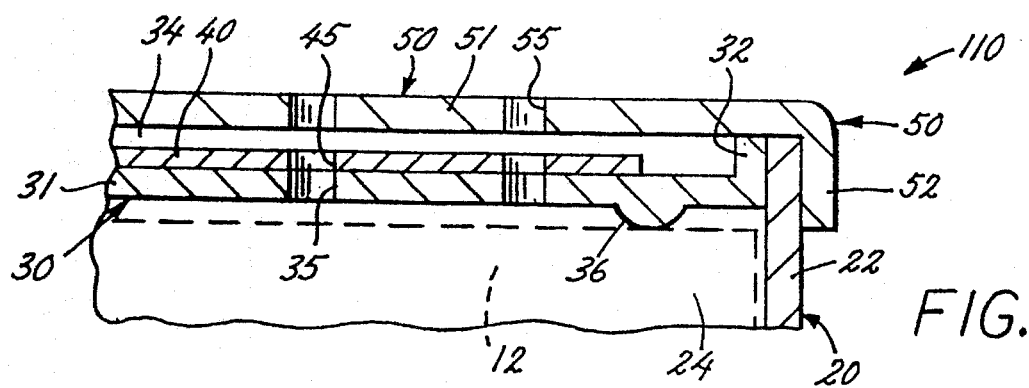

METAL-AIR BATTERIES HAVING IMPROVED AIR ACCESS VALVES

FIELD OF THE INVENTION

The present invention relates to metal-air cells and, more particularly, to metal-air cells having improved air access valves having more reliable and effective seals.

BACKGROUND OF THE INVENTION

Metal-air cells typically include a metal anode, an air cathode, and a separator all disposed and supported in some sort of container. The metal anode usually comprises a fine-grained metal powder, such as zinc, aluminum, or magnesium, which is blended together with an aqueous electrolyte, such as potassium hydroxide, and a gelling agent into a paste. The separator is a porous material that allows the passage of electrolyte between the cathode and anode, but prevents direct electrical contact therebetween and short circuiting of the cell.

The air cathode is a catalytic structure designed to facilitate the reduction of oxygen. Typically, it is composed of active carbon, a binder, and a catalyst which, together with a metal current collector, are formed into a thin sheet. The air cathode also commonly incorporates a hydrophobic polymer, such as polytetrafluoroethylene or polystyrene, directly into the cathode sheet and sometimes also as a coextensive film. The hydrophobic polymer prevents electrolyte from flooding the cathode or passing through it and leaking from the cell. The container includes oxygen access openings, diffusion chambers and the like which are designed to allow sufficient oxygen to reach all parts of the air cathode.

Metal-air cells have high specific energies. In fact, zinc-air cells have the highest specific energy, up to 450 Wh/kg, of all aqueous primary systems, and high energy per unit volume as well. The components of zinc-air cells also are relatively benign.

Because of their high energy density, button cells incorporating zinc-air chemistry currently are the most popular energy source for hearing aids. The much larger majority of electronic devices, however, has higher energy requirements requiring the use of larger (i.e., greater than one ampere hour capacity) cells or batteries. Despite the electrochemical advantages of metal-air and especially zinc-air systems, heavy duty and alkaline manganese systems continue to dominate the much larger world market for larger primary batteries.

Many portable electronic devices, such as portable computers, also place severe constraints on battery weight and volume. In such applications, prismatic cells would be preferable over button or cylindrical cells, which latter type of cells, in general, require more space to be allocated in the device than the cells themselves actually occupy. Prismatic zinc-air cells also can be much thinner than alkaline cells of equivalent capacity.

The cells disclosed in U.S. Pat. No. 5,328,778 to G. Woodruff et al. successfully scaled up and reconfigured metal-air cells from the traditional, relatively small button-style design, making them much more suitable for use in the full spectrum of battery powered electronic devices. There remain, however, various unmet performance demands which result when metal-air cells are used outside of their traditional hearing-aid applications.

That is, while oxygen must be able to diffuse into the cathode to discharge a metal-air cell, air circulation into the cell when it is not being used to power a device is generally deleterious. Any oxygen which reaches the anode will directly oxidize the zinc or other metal therein and diminish the electrochemical capacity of the cell which is available to power an electronic device. Moreover, gelled anodes are aqueous based, and moisture loss from the anode can facilitate direct oxidation of metal in the anode and by various other mechanisms reduce the discharge rates and capacity of the cell.

For this reason, new metal-air cells generally are packaged in high moisture barrier film, and the cells are not taken out of their package until they are to be used. Metal-air button cells for hearing aids also generally have very small air holes in their containers, to minimize moisture loss during their service life. Further, hearing aids typically are used for long periods with relatively short intervals of non-use. That is, hearing aids usually are worn all day and are turned off only at night when the user goes to bed. There simply is much less time in the service life of hearing aid cells during which the deleterious effects of unwanted air circulation can take their toll. Most other electronic devices are used intermittently, and there may be long intervals, between uses of the device, when the effects of oxygen access and moisture loss can build.

Accordingly, various battery and cell casings, housings, and the like have been proposed which incorporate a valve or equivalent means to shut off air circulation to a metal-air cell when it is not in service. More recently, U.S. Pat. No. 4,620,111, to W. McArthur et al. has disclosed a battery pack which uses button cells. A number of button cells are disposed in a housing. The housing has openings therein to allow air circulation into the housing and ultimately to the cells. The housing also includes a slide valve which controls the flow of air through the air circulation openings. The design of this housing, however, has significant shortcomings, and it is especially ill suited for use with prismatic cells.

While the slide valve is said to selectively "seal" the air circulation openings, inherently the seal is far from perfect. The part tolerances needed to allow easy movement of the slide valve between its open and shut positions also allow the valve, depending on the orientation of the housing, to shift away from the surface in which the openings are located. Under such conditions, air can flow under and around the slide valve. Moreover, even when the slide valve is resting over the openings, the seal is not perfect. The valve and housing are injection molded plastic parts and such parts inevitably have some warpage and other imperfections which create paths for air flow between the slide and the apertured surface in which the openings are located.

Such imperfect seals are undesirable when larger, prismatic cells are to be used, even if such valves are tolerable in the context of button cells. Button cells have very restricted gas access, and they are less sensitive to moisture loss. Prismatic cells, designed for higher power levels, have much less gas restriction, making them more sensitive to moisture loss.

Other "valved" metal-air batteries have been proposed which may offer more reliable sealing of a cell's oxygen access opening, such as disclosed in U.S. Pat. No. 4,177,327 to J. Mathews et al. and U.S. Pat. No. 4,493,880 to J. Lund. In Mathews '327, the batteries include a flexible element having a synthetic rubber plug. The flexible element is biased such that in its vent-closed position the plug seats against a single oxygen access opening. Electrically powered actuator means are provided to move the flexible element and plug away from the opening to allow air into the battery.

Lund '880 discloses a sliding switch which, upon movement between the closed and open positions, selectively covers and uncovers a single oxygen access opening with an adhesive, flexible closure strip. The switch is provided with spring finger contacts which urge the slide downwardly to facilitate adhesion of the closure strip over the opening.

Both designs, however, are somewhat complicated and are not well suited to larger batteries which frequently have many oxygen access openings with a total cross-section which may be fairly large. For example, in larger batteries having larger slide valves, biasing the slide against the surface in which access openings are located would require either a large number of springs or a relatively heavy, stiff slide. Since the force is applied noncontinuously on the slide at discrete points, thinner, lightweight slides tend to flex away from the surface in areas distant from a spring, and flexing can diminish the overall effectiveness of the seal. Heavy, complicated valves, on the other hand, run counter to the recognized goal of producing simple, lightweight batteries.

An object of this invention, therefore, is to provide metal-air cells and batteries which are more suitable for use in powering electronic devices which are used intermittently over the service life of the battery.

It also is an object to provide prismatic metal air cells and batteries in which the gelled anode is less susceptible to oxygen attack and moisture loss resulting from unwanted air circulation.

A related and more specific object of the invention is to provide metal-air cells and batteries having a valved casing which allows air circulation when the cells are in use, but more effectively restricts the access of air to the cells during periods of non-use.

Another object is to provide such cells and batteries wherein the valve is more readily susceptible to use in relatively large cells having many oxygen access openings.

A further object of the invention is to provide such cells and batteries which may be manufactured easily and economically.

Yet another object is to provide such cells and batteries wherein all of the above-mentioned advantages are realized.

Those and other objects and advantages of the invention will be apparent to those skilled in the art upon reading the following detailed description and upon reference to the drawings.

SUMMARY OF THE INVENTION

Accordingly, the subject invention provides for a prismatic metal-air battery having at least one prismatic metal-air cell received in a cell cavity of a prismatic casing. The casing comprises a wall portion which defines a surface. The wall portion has at least one opening in communication with the cell cavity which is adapted to allow the passage of air into the cell cavity.

The casing also includes a valve member having a surface bearing on the wall portion surface. The valve member also has at least one opening therein. The wall portion surface and the valve member surface are adapted to allow movement of the valve member across the wall portion surface between a closed position, in which the valve member opening does not overlap with the wall portion opening, and an open position, in which the valve member opening and wall portion opening at least partially overlap.

Importantly, the casing also includes means for providing an attractive force between the wall portion and the valve member. This attractive force tends to seal the valve member to the wall portion. Thus, the casings of the novel batteries more effectively restrict the flow of air to the cells when the valve is in its closed position. Because the casing, although valved, more effectively restricts the flow of air into the cells during periods of non-use, the batteries of the subject invention are much more suitable for use in powering electronic devices which may be used intermittently over the service life of the battery.

BRIEF DESCRIPTION OF THE DRAWINGS

FIG. 1 is a top, right, and front perspective view of a first preferred embodiment 10 of the metal-air batteries of the subject invention having portions torn away to illustrate details of the internal components of the battery 10;

FIG. 2 is a somewhat enlarged, partial cross-sectional view taken generally along the plane defined by lines 2—2 of the battery 10 shown in FIG. 1, showing further details of the internal components of the battery;

FIG. 3 is an enlarged cross-sectional view of area 3 of the battery 10 shown in FIG. 2;

FIG. 4 is a enlarged cross-sectional view taken generally along the plane defined by lines 4—4 of the battery 10 shown in FIG. 1;

FIG. 5 is an enlarged cross-sectional view of a portion of a composite sheet 33 utilized in the battery 10 shown in FIGS. 1–3;

FIG. 6 is an enlarged, partial cross-sectional view, similar to the view of FIG. 3, of a second preferred embodiment 110 of the metal-air cells of the subject invention; and FIG. 7 is an enlarged, partial cross-sectional view, similar to the views of FIGS. 3 and 6, showing a third preferred embodiment 210 of the metal-air cells of the subject invention.

DETAILED DESCRIPTION OF THE INVENTION

FIGS. 1–4 illustrate a first preferred embodiment 10 of the subject invention. As seen in FIG. 1, the battery 10 has a prismatic casing 11. Overall, the casing 11 has a generally solid-rectangular shape having bottom, side, and top walls. It should be understood, however, that the terms "top", "bottom", "side", and like orientational terms, as used herein are relative terms and are employed for convenience in describing the various embodiments of this invention. In service, the novel batteries can be used in any orientation.

The approximate dimensions of the battery 10 are 0.8"×7.6"×11.1", and the battery 10 accommodates six zinc-air cells, each having approximate dimensions of 3.6"×3.4"×0.5". Accordingly, each cell incorporates a relatively large amount of active zinc, and the battery has a higher capacity (approximately 50 Wh) more suitable for electronic devices, such as portable computers, which have high energy requirements. Since the casing is provided with improved valve means for controlling the flow of oxygen to the cells, as described below, the batteries also are better adapted for intermittent use of the electronic device.

More specifically, the novel batteries include at least one metal-air cell. That is, the novel batteries may include a single cell or any number of cells as desired. The cells are received in a cell cavity of the casing which is adapted to house the desired number of cells in a secure manner.

The casing 11, for example, includes a bottom part 20 and an intermediate cover 30, as seen best in FIGS. 2 and 3. The bottom part 20 includes a generally rectangular bottom wall 21 and side walls 22 which extend upwards from and generally perpendicular to the perimeter of the bottom wall 21. The top of the bottom part 28 is generally open. The intermediate cover 30 is a generally rectangular plate 31 from the perimeter of which extend generally perpendicular, relatively short upstanding side walls 32. The plate 31 is covered with a composite sheet 33, the structure and function of which is discussed in further detail below.

The relative size and configuration of the bottom part 20 and the intermediate cover 30 are coordinated such that the intermediate cover 30 telescopes into the open top of the bottom part 21 where its side walls 32 are sealed to the side walls 22 of the bottom part 21 along the upper ends thereof. The bottom part 20 and intermediate cover 30 thereby define a cell cavity 24 which, in this preferred embodiment 10, accommodates six prismatic metal-air cells 12 (shown schematically in phantom) arranged side by side in a 3 by 2 array.

The cells 12 preferably are zinc-air cells constructed generally as described in the aforementioned Woodruff et al. '778 patent. Such cells are preferred for the many advantages described more fully in the '778 patent. In general, however, the casings of the novel batteries are adaptable for use with a wide variety of metal-air cells.

The cells 12 are interconnected in series to provide a battery of approximately 7.2 volts by appropriate connectors (not shown). The casing, although having a generally solid-rectangular shape, has what may be visualized as a relatively small projection 13 from the basic geometry of the casing 11 as seen in FIG. 1. The projection 13 provides space for internal connections and a receptacle 14 which is adapted to receive the plug of a power cord connected to an electrical device. The precise manner in which the individual cells are interconnected and the manner in which the device is connected to the battery, however, are not part of the subject invention. The cells also may be connected parallel or in a combination of parallel and series as necessary to achieve desired output characteristics. Likewise, any suitable connectors may be used to establish electrical interconnection between the cells and between the battery and device, and the design of the connectors will be coordinated with the design of the cell terminals, the design of the power terminals in the device, and other well known factors as will be readily appreciated by workers in the art.

The casing of the novel batteries also includes a wall portion which has at least one opening in communication with the cell cavity. The wall portion of the opening is adapted to allow passage of air into the cell cavity, so that the cells therein have a sufficient supply of oxygen for discharge. The wall portion opening or openings should allow enough oxygen to reach the cell to satisfy the electrochemical requirements of a cell, but it will be appreciated that excessively high circulation therethrough will increase evaporation of water from the cell. The wall portion, therefore, preferably has an array of relatively small openings distributed uniformly over the cells instead of a single or relatively few large openings.

Accordingly, the intermediate cover 30 has a large number of relatively small openings 35 extending through the plate 31 and sheet 33. The plate 31 and sheet 33 form a composite structure which provides a wall portion having an upper surface, in this instance, the upper surface of sheet 33. The openings 35 are generally cylindrical with a diameter of approximately 0,093". They are arranged in six 8 by 8 arrays, each array of openings 35 being more or less centered directly over a cell 12. The openings 35 provide sufficiently rapid and uniform transport of oxygen into the cavity 24 as is needed to power cells 12. The precise size, number, and arrangement of the openings which communicate with the cell cavity, however, are susceptible to considerable variation consistent with the needs of the cells utilized in the battery.

The cell cavity of the novel batteries preferably is adapted to receive the cells such that movement of the cells and damage to the cells and cell connectors resulting therefrom is minimized. At the same time, however, the casing preferably includes means for spacing the cells away from the interior surfaces of the cavity so that air can circulate around the cells as needed. Accordingly, the bottom part 20 and intermediate cover 30 include, respectively, a plurality of bosses 26 and 36. Cells 2, as described more fully in the '778 patent, have vent openings in the bottom thereof to allow gas within an anode expansion space to escape as the cell's anode expands during discharge. The cells also have oxygen access openings in the top to allow oxygen to reach the air cathode. Accordingly, bosses 26 elevate the cells slightly off the bottom wall 21 of the bottom part 20 so that venting of gas from the cell will not be impaired. Likewise, bosses 36 space the cells 12 slightly away from the underside of plate 31 of the intermediate cover 30 so that air may circulate freely over the oxygen access openings of the cells 12. Bosses or ribs also may be provided on the cell instead of the casing. Foam inserts may be provided for spacing and shock absorption as well, and in general, a wide variety of spacing means are known and can be used as desired or needed.

The casings of the novel battery also include a valve member which controls the flow of air through the casing wall portion openings. Accordingly, the valve member is mounted on the casing for movement between open and closed positions. In the closed position, the valve member covers the wall portion openings, and in the open position the wall portion openings are uncovered. Preferably, the valve member has a surface which bears on a surface on the wall portion and has at least one opening therein. The wall portion surface and the valve member surface are adapted to allow movement of the valve member across the wall portion surface between a closed position, in which the valve member opening does not overlap with the wall portion opening, and an open position, in which the valve member opening and wall portion opening at least partially overlap. It will be appreciated, of course, that the valve member opening and wall portion opening are coordinated to allow the selective opening and closing thereof as described, and thus, that the valve member preferably has an array of relatively small openings similar to the preferred array of openings in the wall opening.

Accordingly, the casing of the battery 10 includes a slide valve 40 and a final cover 50. The final cover 50 has a generally rectangular top wall 50 from the perimeter of which depend generally perpendicular, relatively short side walls 52. The final cover 50 is sized and configured such that it telescopes over the open top of the bottom part 20 such that it is spaced from the intermediate cover 30. Thus, the final cover and the final cover 50 provide the outer, protective bottom, side, and top walls of the casing, and intermediate cover 30 define an upper cavity 34 located over the cell cavity The final cover has at least one opening which communicates with the upper cavity to allow passage of air into the upper cavity and ultimately through the intermediate cover to the cells. Preferably, the final cover has an array of relatively small openings distributed uniformly over the cells, the precise size, number, and arrangement of which are coordinated in the same manner and for the same reasons as are the openings in the casing wall portion.

For example, like the intermediate cover 30, top wall 50 of the final cover 50 has a large number of generally cylindrical, relatively small openings 55. The final cover openings 55 correspond in size and arrangement to the intermediate cover openings 35. Thus, air may circulate freely from the ambient through the final cover openings into the upper cavity The slide valve 40 is disposed in the upper cavity and is free to slide back and forth across the intermediate cover 30, or, more precisely, across the sheet 33 adhered to the plate 31 of the intermediate cover 30. The slide valve 40 has a large number of relatively small openings which also correspond in size and arrangement to the openings 35 in the intermediate cover 30. Accordingly, when the slide valve 40 is in its extreme left "open" position (as shown in FIGS.1–3), the openings 45 in the valve member 40 are aligned with the openings 35 in the intermediate cover plate 30 and air may circulate freely from the upper cavity 34, through the openings 35, and into the cell cavity 24. On the other hand, when the slide valve 40 is translated slightly to its extreme right "closed" position, the openings 35 and 45 are completely out of alignment and the valve member 40 covers the openings 35 such that air may not circulate into the cell cavity It will be appreciated that the slide valve 40 is sized such that its lateral movement across the intermediate cover 30 is confined to movement along the path between its open and closed positions. That is, the width of the slide valve 40 is just slightly less than the distance between the longer, opposing side walls 32 of the intermediate cover 30 so that the slide valve 40 is precluded from any significant lateral shifting therebetween. The length of the slide valve 40, of course, is sufficiently shorter than the distance between the shorter opposing side walls to allow the slide valve 40 to move between its open and closed positions as described above. Stops, grooves, channels, guides, and the like may be provided in lieu thereof, however, and in general, any suitable means for restricting the movement of the slide valve 40 to the desired path may be used.

The slide valve 40 has knobs 41 which allow a user to manipulate the slide valve 40. The knobs 41 are secured by screws 42 to threaded post 43 which extend through oval shaped passageways 53 in the final cover 50 and are soldered to the slide valve 40. It will be appreciated, however, that the knobs may be affixed by any suitable means, and in general, any means for manipulating or actuating the slide valve 40 may be used. Many such designs are known to workers in the art.

The passageways 53 are sized such that when the posts 43 of the knobs 41 abut the ends of the passageways 53, the slide valve 40 is aligned in its closed and open positions. The length of the slide valve 40 also may be coordinated such that abutment of the ends thereof against the intermediate cover side walls 32 provides the proper alignment of the valve 40 in its closed and open positions. Any suitable means for appropriately limiting the extent of movement of the slide valve 40 along its predetermined path may be used, however, so long as there is sufficient overlap of the intermediate cover openings 55 and the slide valve openings 45 in the open position and no overlap in the closed position.

In accordance with a principal aspect of the batteries of the subject invention, the battery casings also include means for providing an attractive force between the wall portion of the casing through which the air circulation openings extend and the valve member. This attractive force tends to seal the valve member to the wall portion and more effectively shut off the flow of air through the openings. For example, the intermediate cover 30 and slide valve 40 of the casing include magnetic materials which provide an attractive magnetic force between the intermediate cover 30 and the slide valve 40. More specifically, the composite sheet 33 which covers plate of the intermediate cover 30, as shown in FIG. 4, is composed of three layers. The principal layer is a sheet 33b of a permanently magnetized, ferromagnetic/elastomer blend material, sandwiched between a top layer polymeric film 33a, such as a Mylar or polypropylene film, and a bottom layer 33c of adhesive. The slide valve 40 is fabricated from a ferromagnetic metallic sheet. Thus, an attractive magnetic force is created between the intermediate cover 30 and the slide valve 40 which tends to seal the slide valve 40 against the intermediated cover It will be appreciated, therefore, that the casings of the novel batteries more effectively restrict the flow of air to the cells when the valve is in its closed position. For example, since the intermediate cover 30 and slide valve 40 are mutually attracted, the slide valve 40 continually bears on the intermediate cover 30, even when the battery is upside down. Thus, there is less likelihood that the slide valve 40 will fall away from the intermediate cover 30 and allow air to bypass the slide valve 40. Moreover, since the sheet 33 is composed in large part of elastomeric material, and the sheet 33 and slide valve 40 are subject to attractive forces, the sheet 33 and valve 40 tend to conform to each other. Even if the intermediate cover 30 and valve 40 are slightly warped or if there are imperfections in their surfaces, therefore, paths for air flow between the intermediate cover 30 and valve 40 are minimized. The magnetic sheet 33 also creates an attractive force which is continuous over the entire area in which the intermediate cover openings 35 are located. Thus, localized forces, which may help seal openings near the point on which the force bears, but which also may cause flexing of the valve and leakage around more remote openings, are avoided.

Moreover, it will be appreciated that the batteries of the subject invention are able to achieve significant improvement in performance with a design which is simple and economically manufactured. Since the intermediate cover and slide valve are mutually attracted, there is no need for springs to bias the valve against the intermediate cover. Likewise, it is not necessary to minimize part tolerances to the degree necessary in other designs where guides are used to hold the valve closely against a surface, but which also must allow the valve to move freely.

As noted, the magnetic sheet 33 includes a top layer of a polymeric film 33a such as a Mylar or polypropylene film. While not essential, the use of such films or their equivalent is preferred as they facilitate the movement of the valve 40 by reducing frictional resistance between the valve 40 and intermediate cover 30. Mylar films have lower coefficients of friction, but polypropylene films are more preferred because they are sufficiently slick and, in the event of unintended leakage from the cells, are more resistant to electrolyte and other byproducts of the cell's electrochemistry. Other suitable films may be used, however, and a polymer film also may be applied to the valve in addition to or in lieu of applying a film to the intermediate cover. Moreover, other means of reducing the frictional resistance between the slide and intermediate cover may be used, such as silicone oil. Preferably, however, the valve should not move so freely that it slides back and forth during service, thereby inadvertently closing off the supply of oxygen when the cell is intended to be discharged. For that reason, therefore, detent members may be formed in the passageways 53 in the final cover or equivalent means may be provided to releasably hold the valve 40 in its open and closed positions.

The various structural components of the casing, as exemplified by the bottom part 20, intermediate cover 30, and final cover 50 may be fabricated from any material which is sufficiently rigid and durable to mount the cells securely and to protect them against damage during service. Preferably, the casing material is resistant to electrolyte and the electrochemical byproducts of the cell in the event that leakage from the cell occurs. A large number of suitable materials are known for battery housings, and in general, they may be used in the batteries of the subject invention.

If the battery is large, however, weight considerations make the use of structural plastics highly preferable. Such plastics include polyethylene, polypropylene, and nylon. Acrylonitrile-butadiene-styrene plastics are especially preferred for their attractive mechanical and thermal processing characteristics, as well as being cost effective.

Suitable plastic components may be fabricated by injection molding or other conventional methods. The casing parts may be sealed by adhesives, such as hot-melt or epoxy adhesives, by ultrasonic welding or other welding techniques, or by any other conventional method. Preferably, the container parts are provided with various stops, beads, and the like to facilitate final assembly and joining of the container parts.

As noted previously, the slide valve preferably is composed of a thin metal sheet, most preferably of metal sheeting which is chemically resistant to the cell electrolyte such as stainless steel. The slide valve can be fabricated easily by punching or other conventional metal working techniques. The magnetic sheet typically is composed primarily of ferromagnetic compounds, such as barium/strontium ferrite, which is blended with various elastomers, such as polyvinyl acetate, chlorosulfonated polyethylene, polyisobutylene, chlorinated polyethylene, polyacrylic rubber, polyethylene, ethylene propylene terpolymer, nylon copolymer, nitrile rubber, and mixtures thereof. Such magnetic sheet materials are available commercially, and also available with a "peel-and-stick" self adhesive layer and a Mylar film from a number of sources, such as Magnetic Specialty, Inc., Marietta, Ohio. Such materials have been found to be cost effective and to provide excellent sealing of the air circulation openings. It will be appreciated, however, that the slide valve can be fabricated from magnetized metal or fabricated of structural plastic and magnetized sheets as is the intermediate cover. Similarly, the intermediate cover may be fabricated from metal, and in general, any complementary magnetic materials which have sufficiently strong mechanical properties and otherwise are chemically compatible with the electrochemistry of the cells may be used to fabricate the valve and its abutting casing wall.

The use of magnetic materials to provide an attractive magnetic force between the wall portion and valve member, as exemplified in the casing 11 of battery 10, has been found to provide excellent sealing of the cells when the battery is not in use. It will be appreciated, however, that other means of providing an attractive force between the valve member and the casing wall portion may be used in accordance with the subject invention. The novel batteries may include a film of liquid which is disposed between the wall portion surface and the valve member and serves to provide an attractive capillary force therebetween. The casings of the novel batteries also may have a wall portion and valve member which include insulator materials having opposite static charges which provide an attractive electrostatic force between the wall portion and valve member.

For example, FIG. 5 illustrates a second preferred embodiment 110 of the subject invention. The battery 110 is constructed substantially as is battery 10 described above (like numerals referring to like elements). The battery 110 however, is not provided with a magnetic sheet 33. Instead, a thin film of liquid 137, such as silicone oil, is interposed between the plate 31 of the intermediate cover 30 and the slide valve 40. The film 137 creates an attractive capillary force between the intermediate cover 30 and the valve member 40 analogous to the attractive force provided by the magnetic materials in casing 11 of battery 10.

Silicone oil is believed to provide satisfactory performance as described above, but it is expected that other liquids which have a sufficiently low vapor pressure to ensure that they do not evaporate over the service life of the battery and which are chemically compatible with the battery may be used. It also will be appreciated that despite the presence of a liquid film interposed between the valve plate 31 and the slide valve 40, either for purposes of establishing an attractive capillary force or as a lubricant, the slide valve 40 is still considered to "bear" on the intermediate cover 30 as that term is used herein.

FIG. 6 illustrates a third preferred embodiment 210 of the subject invention. The battery 210 is constructed substantially as are batteries 10 and 110 described above, except that magnetic materials and capillary liquids are not utilized. Instead, intermediate cover 30 and side valve 40 are both composed of insulator materials, such as the structural plastics discussed above. The intermediate cover 30 and slide valve 40 have opposite static charges, thereby providing an attractive electrostatic force therebetween. Charges sufficient to provide the necessary degree of attractive force may be applied to the intermediate cover 30 and slide valve 40 by any suitable means, for example, an electrostatic charger.

Thus, those skilled in the art will appreciate that the batteries of the subject invention are much more suitable for use in powering electronic devices which have higher energy requirements and which may be used intermittently over the service life of the battery. In large part because the valve and the casing wall against which it bears are mutually attracted, the casings of the novel batteries more effectively restrict the flow of air into the cells during periods of non-use. Because the cells are exposed to much less air circulation when the battery is turned off, cells which otherwise are more susceptible to the ill effects of unwanted air circulation, such as cells with gelled anodes and relatively large cells, may be used. Such larger and more efficient cells, in turn, allow the battery to provide a practical alternative power source for electronic devices with large power requirements, even if the device will be used intermittently.

This invention has been disclosed and discussed primarily in terms of specific embodiments thereof, but it is not intended to be limited thereto. For example, though described primarily in the context of zinc-air cells, the cells of the subject invention may be based on other metal-air electrochemistry and may incorporate other metal-anodes such as aluminum or magnesium. Moreover, though the design is particularly advantageous when the novel batteries utilize large prismatic cells, the cells may be relatively small and have a cylindrical or button configuration. The valve member most advantageously is a horizontally sliding member, but the valve member may be cammed or otherwise translated in a vertical division such that it covers and uncovers the wall portion openings. Other modifications and embodiments will be apparent to workers in the art.

We claim as our invention:

1. A prismatic metal-air battery having at least one prismatic metal-air cell received in a cell cavity of a prismatic casing, wherein the casing comprises:

a wall portion having at least one opening in communication with the cell cavity and a surface proximate to said wall portion opening;

a valve member having at least one opening therein and a surface proximate of said valve member opening which bears on said wall portion surface, said valve being moveable between a closed position in which the valve member opening does not overlap with the wall portion opening, in which said closed position air is blocked from entering said cell cavity through said wall portion opening by said valve member, and an open position in which the valve member opening and wall portion opening at least partially overlap, in which said open position air may enter said cell cavity through said wall portion opening and said valve member opening; and means for providing an attractive force between the wall portion and the valve member.

2. The metal-air battery of claim 1, wherein said means for providing an attractive force include structure associated with at least one of the wall portion and the valve member sealing the wall portion and valve member together.

3. The metal-air battery of claim 2, wherein the wall portion and valve member include magnetic materials thereby providing an attractive magnetic force between the wall portion and valve member.

4. The metal-air battery of claim 3, wherein the wall portion and the valve member are at least partially composed of ferromagnetic material.

5. The metal-air battery of claim 3, wherein the wall portion is a composite structure including a permanently magnetized, ferromagnetic elastomeric sheet and the valve member includes a metallic sheet.

6. The metal-air battery of claim 2, wherein the wall portion and valve member include insulator materials having opposite static charges thereby providing an attractive electrostatic force between the wall portion and valve member.

7. The metal-air battery of claim 1, wherein a film of liquid is disposed between the wall portion surface and valve member surface thereby providing an attractive capillary force between the wall portion and valve member.

8. The metal-air battery of claim 1, wherein the attractive force is continuous over the abutting surfaces of the wall portion and valve member.

9. The metal-air battery of claim 1, wherein the wall portion and valve member each have an array of relatively small openings distributed uniformly over the cells.

10. A prismatic metal-air battery comprising a prismatic casing, the casing comprising:

a bottom part having an open top, a bottom wall, and side walls;

an intermediate cover sealed to the top of the bottom part and having at least one opening therein, the bottom part and intermediate cover cooperating to define a cavity receiving at least one prismatic metal-air cell, the intermediate cover opening being in communication with the cell cavity;

a final cover sealed to the top of the bottom part over and spaced from the intermediate cover, the intermediate cover and final cover cooperating to define an upper cavity, the final cover having at least one opening communicating with the upper cavity; and a valve member slideably disposed in the upper cavity and bearing on the intermediate cover, the valve member having at least one opening therein and being slidable across the intermediate cover between a closed position in which the valve member opening does not overlap the intermediate cover opening and an open position in which the valve member opening and intermediate cover opening at least partially overlap;

wherein the valve member and intermediate cover include magnetic materials providing an attractive magnetic force between the intermediate cover and valve member.

11. The metal-air battery of claim 10, wherein the intermediate cover and the valve member are at least partially composed of ferromagnetic materials.

12. The metal-air battery of claim 10, wherein the intermediate cover includes a permanently magnetized, ferromagnetic elastomeric sheet and the valve member includes a metallic sheet.

13. The metal-air battery of claim 10, wherein at least one of the intermediate cover and valve member has a polymeric film adhered thereto which reduces the translational resistance between the intermediate cover and valve member.

14. The metal-air battery of claim 13, wherein the polymeric film is a mylar film.

15. The metal-air battery of claim 10, wherein the valve member is a sheet.

16. The metal-air battery of claim 10, wherein the intermediate cover, final cover, and valve member each have an array of relatively small openings distributed uniformly over the cells.

17. A prismatic metal-air battery having at least one prismatic metal-air cell received in a cell cavity of a prismatic casing, wherein the casing comprises:

a wall portion having at least one opening in communication with the cell cavity; and a valve member mounted on the casing for movement between a closed position in which the valve member covers the wall portion opening and an open position in which the valve member does not cover the wall portion opening;

wherein the wall portion and valve member include magnetic materials thereby providing an attractive magnetic force between the wall portion and valve member.

18. The metal-air battery of claim 17, wherein the valve member includes a surface bearing on a surface on the wall portion and having at least one opening therein, which valve member opening, when the valve member is in the closed position, does not overlap with the wall portion opening and, when the valve member is in the open position, at least partially overlaps the wall portion opening.

19. The metal-air battery of claim 17, wherein the wall portion defines a flat surface and the valve member is a sheet abutting the wall portion and having at least one opening therein, which valve member opening, when the valve member is in the closed position, does not overlap with the wall portion opening and, when the valve member is in the open position, at least partially overlaps the wall portion opening, the valve member being slidable across the wall portion surface between the closed and open positions.

20. In a metal-air battery having at least one metal-air cell received in a cell cavity of a casing, the casing including at least one opening in communication with the cell cavity and a valve member which is moveable between an open position in which said valve member allows air to pass through said casing opening and a closed position in which said valve member blocks air from passing through said casing opening, the improvement comprising means for providing an attractive force between the casing and the valve member.

21. A prismatic metal-air battery comprising a prismatic casing, the casing comprising:

- a bottom part having an open top, a bottom wall, and side walls;
- an intermediate cover sealed to the top of the bottom part and having at least one opening therein, the bottom part and intermediate cover cooperating to define a cavity receiving at least one prismatic metal-air cell, the intermediate cover opening being in communication with the cell cavity;
- a final cover sealed to the top of the bottom part over and spaced from the intermediate cover, the intermediate cover and final cover cooperating to define an upper cavity, the final cover having at least one opening communicating with the upper cavity; and
- a valve member slidably disposed in the upper cavity and bearing on at least one of the intermediate cover or final cover, the valve member having at least one opening therein and being slidable across the cover between a closed position in which the valve member opening does not overlap the cover opening and an open position in which the valve member opening and cover opening at least partially overlap;
- wherein a film of liquid is disposed between the cover and the valve member thereby providing an attractive capillary force between the cover and the valve member.

22. The metal-air battery of claim 21, wherein the valve member bears on the intermediate cover and the film of liquid is disposed between the intermediate cover and the valve member.

23. The metal-air battery of claim 21, wherein the valve member is a sheet abutting a flat surface on at least one of the intermediate cover or final cover.

24. The metal-air batter of claim 23, wherein the valve member is a sheet abutting a flat surface on the intermediate cover.

25. A valve for controlling air flow through a port in a casing in a prismatic metal-air battery, the valve comprising:

- a valve member mounted on the casing for movement between an open position in which the valve member allows air to pass through the port; and
- means for providing an attractive force between at least a portion of the casing proximate to the port and the valve member.

* * * * *